United States Patent
Pichavant

(10) Patent No.: US 8,971,237 B2
(45) Date of Patent: Mar. 3, 2015

(54) METHOD OF COMMUNICATION BETWEEN AN AIRCRAFT AND A GROUND STATION

(75) Inventor: Claude Pichavant, Toulouse (FR)

(73) Assignee: Airbus Operations, Toulouse (FR)

( * ) Notice: Subject to any disclaimer, the term of this patent is extended or adjusted under 35 U.S.C. 154(b) by 364 days.

(21) Appl. No.: 13/048,237

(22) Filed: Mar. 15, 2011

(65) Prior Publication Data

US 2011/0228723 A1    Sep. 22, 2011

(30) Foreign Application Priority Data

Mar. 22, 2010 (FR) ...................... 10 52045

(51) Int. Cl.
*H04W 84/02* (2009.01)
*H04B 7/185* (2006.01)

(52) U.S. Cl.
CPC ........ *H04B 7/18506* (2013.01); *H04B 7/18508* (2013.01)
USPC ...................................... 370/316

(58) Field of Classification Search
CPC ........... H04B 7/18506; H04B 7/18515; H04B 7/18576
USPC ..................................... 370/316
See application file for complete search history.

(56) References Cited

U.S. PATENT DOCUMENTS

| | | | |
|---|---|---|---|
| 7,899,621 B2 * | 3/2011 | Breed et al. | 701/301 |
| 7,990,283 B2 * | 8/2011 | Breed | 340/903 |
| 8,112,113 B2 * | 2/2012 | Shinada et al. | 455/552.1 |
| 8,255,144 B2 * | 8/2012 | Breed et al. | 701/117 |
| 8,521,156 B2 * | 8/2013 | Alcorn | 455/431 |
| 2006/0096857 A1 * | 5/2006 | Lavitsky et al. | 204/298.28 |
| 2006/0189309 A1 * | 8/2006 | Good et al. | 455/427 |
| 2009/0077266 A1 | 3/2009 | Alrabady et al. | |
| 2009/0100476 A1 * | 4/2009 | Frisco et al. | 725/68 |
| 2009/0172080 A1 * | 7/2009 | Pandit | 709/203 |
| 2009/0258652 A1 * | 10/2009 | Lambert et al. | 455/446 |
| 2010/0015971 A1 * | 1/2010 | Good et al. | 455/427 |
| 2010/0035553 A1 * | 2/2010 | Shinada et al. | 455/62 |
| 2010/0189089 A1 * | 7/2010 | Lynch et al. | 370/338 |
| 2010/0202557 A1 * | 8/2010 | Harris | 375/295 |
| 2010/0265999 A1 * | 10/2010 | Stern et al. | 375/219 |
| 2010/0266062 A1 * | 10/2010 | Mussmann et al. | 375/267 |
| 2011/0092237 A1 * | 4/2011 | Kato et al. | 455/507 |
| 2011/0123028 A1 * | 5/2011 | Karabinis | 380/270 |
| 2012/0214472 A1 * | 8/2012 | Tadayon et al. | 455/418 |
| 2012/0236785 A1 * | 9/2012 | Lynch et al. | 370/316 |
| 2012/0238204 A1 * | 9/2012 | Lynch et al. | 455/13.1 |
| 2012/0240170 A1 * | 9/2012 | Lynch et al. | 725/71 |

(Continued)

OTHER PUBLICATIONS

Spectrum Wiki.*

(Continued)

*Primary Examiner* — Jay P Patel
(74) *Attorney, Agent, or Firm* — Oliff PLC

(57) ABSTRACT

The method of communication between an airplane and the ground, the aircraft communicates by radiowaves with the ground via at least one satellite and in a frequency band extending from 5030 MHz to 5091 MHz, bounds included, using a WiMax type transmission standard. The invention also provides an on-board communications terminal for an aircraft, suitable for communicating by radiowaves with the outside of the terminal in a frequency band extending from 5030 MHz to 5091 MHz, bounds included, in application of a WiMax type transmission standard.

13 Claims, 1 Drawing Sheet

(56) References Cited

U.S. PATENT DOCUMENTS

2012/0287903 A1* 11/2012 Alcorn .......................... 370/331
2013/0237142 A1* 9/2013 Brisebois et al. ................. 455/1

OTHER PUBLICATIONS

Axel; "Aeronautical Communications Panel (ACP) Eighteenth Meeting of Working Group F," May 12, 2008; pp. 1-6; obtained Oct. 29, 2010 from http://www.icao.int/anb/panels/ac/wg/f/wg18/ACP-WGF18-WP06__5GHz__AMSRS__v1.doc.
Gribbin; "Aeronautical Satellite Networks:" Nov. 9, 1988; pp. 135-138; XP010078707.
French Preliminary Search Report dated Nov. 4, 2010 in corresponding French Patent Application No. 1052045 (with translation).
Sep. 3, 2014, Chinese Office Action issued in Chinese Application No. 201110069979.4 (with partial English translation).

* cited by examiner

METHOD OF COMMUNICATION BETWEEN AN AIRCRAFT AND A GROUND STATION

FIELD OF THE INVENTION

The invention relates to communication between aircraft and the ground.

BACKGROUND OF THE INVENTION

The needs for exchanging information between an airplane and the ground are constantly increasing since they are associated in particular with updating components of information systems of the airplane, with conveying flight information from ground stations, with conveying airplane maintenance information for optimizing operating costs, and with services made available to passengers.

During various stages of the operation of an airplane, different communications means need to be used depending on the situation of the airplane (stationary on the ground, taxiing, taking off or landing, continental flight, oceanic flight, or polar flight). Airplanes are thus fitted with a plurality of radiofrequency communications systems capable of connecting to the communications infrastructure that is the most appropriate for each of the operating stages of the airplane. Depending on the types of information being conveyed and on their potential impact on the safety of airplane operation, those communications systems must also satisfy reliability specifications that are constraining to a greater or lesser extent.

The communications systems in use comprise infrastructures that are specific to aviation communications, such as the ARINC communication addressing and reporting system (AGARS) or the aeronautical telecommunication network (ATN) which rely on very high frequency (VHF), high frequency (HF), or satellite links. Those historical networks are nowadays associated with the use of infrastructures based on "open world" technologies such as WiFi, WiMax, GSM, GPRS, and UMTS for use when the airplane is on the ground, or Swift64 and SBB when the airplane is in flight.

Even though having multiple accessible infrastructures is advantageous in terms of availability and reducing the cost of communications, in order to optimize costs airplane operators seek to optimize not only the weight and volume of on-board equipment and the impact of antennas on the aerodynamic behavior of the airplane, but also the costs of communication between the airplane and the ground.

In this general context, and in order to handle the increase in worldwide air traffic, new communications infrastructures are being defined and standardized. These infrastructures are designed to take charge of the exchanges of data that are needed for providing air traffic control by the authorities (air traffic services or ATS). This work has thus led to selecting a radiofrequency telecommunications system that is based on the worldwide interoperability for microwave access (WiMax) standard to define a communications system in a frequency band around 5 gigahertz (GHz) that has been dedicated by the international telecommunications union (ITU) for aviation applications. Its installation and use will progressively become required for commercial airplanes for the purpose of conveying the information needed for allowing the air traffic control system to take the airplane in charge. That system is for use when the airplane is on the ground, and it is therefore not suitable for use in flight. That system is referred to as AeroWimax or indeed as the aeronautical mobile airport communication system (AeroMACS). Throughout the present application, those two terms are considered as being synonyms.

OBJECT AND SUMMARY OF THE INVENTION

An object of the invention is to further increase the facilities of an airplane in flight to communicate with the ground.

To this end, the invention provides an on-board communications terminal for an aircraft, suitable for communicating by radiowaves with the outside of the terminal in a frequency band extending from 5030 megahertz (MHz) to 5091 MHz, bounds included, in application of a WiMax type transmission standard.

Advantageously, the terminal is suitable for communicating in a second frequency band extending from 5091 MHz to 5150 MHz, bounds included.

In an embodiment, communication takes place in application of an AeroWimax transmission standard.

Preferably, the terminal is suitable for using a single antenna for communications in both frequency bands.

The invention also provides an airplane including a terminal of the invention.

The invention also provides a satellite suitable for communicating with the outside of the satellite by radiowaves in a frequency band extending from 5030 MHz to 5091 MHz, bounds included, in application of a WiMax type transmission standard.

The invention also provides a ground station for communicating with aircraft, the ground station being suitable for communicating by radiowaves with the outside of the station in a frequency band extending from 5030 MHz to 5091 MHz, bounds included, in application of a WiMax type transmission standard.

Thus, the AeroWimax communication system is designed to operate in the frequency band extending from 5091 MHz to 5150 MHz, which band is dedicated to aviation communications applications. In the invention, an adjacent frequency band, defined by the bounds 5030 MHz and 5091 MHz, is used for communications between the aircraft and the ground via a satellite. This band is already used by the multipath instrument landing system or microwave landing system (MLS), but that does not make use of satellite transmission. In the invention, communication between the aircraft and the ground via the satellite in this frequency band makes it possible to implement the AeroWimax communication protocol providing appropriate adaptations are made to enable it to be used in the context of satellite communication.

The invention provides a communications system comprising at least two of the following elements of the invention: an aircraft; a satellite; and a ground station.

The invention also provides a method of communication between an aircraft and the ground, wherein the aircraft communicates by radiowaves with the ground via at least one satellite and in a frequency band extending from 5030 MHz to 5091 MHz, bounds included, using a WiMax type transmission standard.

The invention also provides a method of communication, wherein the aircraft communicates by radiowaves with the outside of the aircraft in a frequency band extending from 5030 MHz to 5091 MHz, bounds included, in application of a WiMax type transmission standard.

The invention also provides a method of communication, wherein a satellite communicates by radiowaves with the outside of the satellite in a frequency band extending from 5030 MHz to 5091 MHz, bounds included, in application of a WiMax type transmission standard.

Finally, the invention provides a method of communication, wherein a ground station communicates by radiowaves with the outside of the station in a frequency band extending from 5030 MHz to 5091 MHz, bounds included, in application of a WiMax type transmission standard.

BRIEF DESCRIPTION OF THE DRAWINGS

Other characteristics and advantages of the invention appear further from the following description of an embodiment given by way of non-limiting example, and with reference to the accompanying figures, in which.

MORE DETAILED DESCRIPTION

Figure 1:
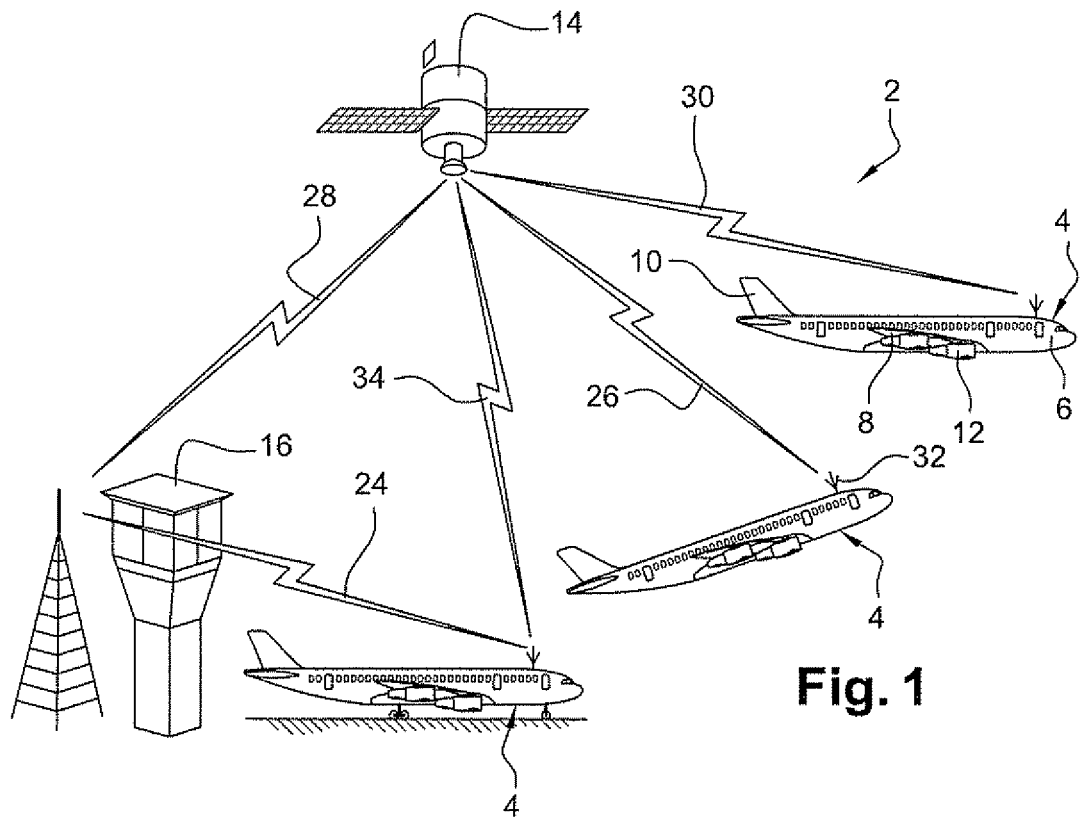
FIG. 1 shows an airplane in various utilization configurations together with a ground station and a satellite forming parts of a system of the invention for implementing the method of the invention.
Figure 2:
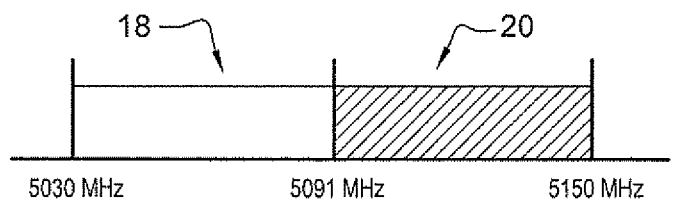
FIG. 2 is a diagram showing frequency bands and including the range used in the ambit of the invention.

FIG. 1 shows a system 2 of the invention for enabling aircraft to communicate with the ground. The system comprises at least one aircraft 4, and preferably a plurality of aircraft. The aircraft is specifically an aerodyne, here comprising an airplane having a fuselage 6, two wings 8, a tail 10, and engines 12 carried by the wings. The system includes at least one satellite 14, and preferably a plurality of satellites that are placed in Earth orbit at an appropriate altitude. Finally, the system 2 includes at least one ground station 16, and preferably a plurality of ground stations. In the ambit of the invention, each of the elements formed by the airplane 4, the satellite 14, and the ground station 16 is configured to transmit and receive communications by implementing the communications method as described below. This is a method of communicating data by radio operating in the frequency band extending from 5030 MHz to 5091 MHz, bounds included. This frequency range 18 in which the invention is implemented is shown in FIG. 2. It is adjacent to a frequency range 20 extending from 5091 MHz to 5150 MHz in which the AeroWimax communications protocol is to operate.

Given that the invention implements a communications protocol of the AeroWimax type in the range 18 and not in the range 20, the protocol is subjected to a few adaptations in the ambit of the invention. Other adaptations are made necessary by the fact that communication between the airplane and the ground takes place via a satellite 14. The range 18 is shared with communications relating to MLS.

The AeroWimax protocol or interface is based on the WiMax standard (standards of the IEEE 802.16 series). That standard relies on using orthogonal frequency division multiplexing (OFDM) technology, which is a method of coding digital signals by sharing them between orthogonal frequencies in the form of multiple subcarriers. That interface also applies to the use of a modulation scheme and to adaptive coding. Given that it was originally designed for terrestrial applications, the channel structure provided by that standard needs to be adapted in the context of the invention in order to accommodate the specific features of communication between the ground 16 and the airplane 4 via the satellite 14. These specific features relate in particular to the speed of the airplane, to the propagation environment that presents fewer multiple paths, and to the time required for propagation via the satellite. In order to implement the invention, the modifications may bear in particular on the waveform (channel structure, modulation, coding, guard times, and/or guard bands). By way of example, the following may be involved:

enabling the system to be used at speeds higher than those permitted by the basic AeroWimax protocol;

taking account of the distance that corresponds to the propagation time between the moving body formed by the airplane and the network access point; and facilitating design of a satellite communications system that provides maximum coverage of the surface of the Earth while minimizing the transmission power required both for the satellite 14 and for the terminals on board airplanes 4.

By way of example, for the physical layer of the interface, these adaptations may lead to reducing the width of the OFDM channels in order to increase the guard bands between them.

The adaptations may thus lead to the structure of those channels being replaced by another system that is better adapted to satellite transmission. For example, this may be a system of the time division multiplexing (TDM) type, which is a multiplexing technique that allows a sender to transmit a plurality of narrow-band individual digital channels (voice, data, video) over a single broadband communications medium by interlacing samples from each of the channels over time. Frequency division multiplexing (FDM) may also be used, serving to share the frequency band over the broadband path as a series of several narrower channels that allow data coming from the various low speed paths to travel without interruption over the high speed path.

The adaptations may also lead to using channels of capacities that are adaptive to the data rate that are actually needed for aviation applications.

It is also possible to envisage modifications to the network access protocol at the level of the media access control (MAC) layer. This is to take account of the speed of the airplane and of the propagation time between the airplane and the communications infrastructure on the ground.

For the MAC layer, these adaptations may lead for example to:

modifying the structures of the time division multiple access (TDMA) frames to take account of the longer propagation time (lengthening guard times between the up path and the down path, for example);

modifying and/or using different parameters for the power control algorithms (no adjustment of levels and time constants, for example); and adapting timing to take account of the longer transmission time associated with transmission via a geostationary satellite.

The satellites 14 may be of geostationary or other type. The ground stations 16 are designed to connect with conventional terrestrial communications networks, in particular the networks mentioned above. FIG. 1 shows the airplane on the ground, while stationary or taxiing, in communication with a ground station 16 via a direct link 24. The same figure shows the airplane while taking-off communicating with the station 16, but via the satellite 14 using respective links 26 between the airplane and the satellite and 28 between the satellite and the station. The same figure shows the airplane in flight and likewise communicating with the station 16 via links 30 and 28. The link 28 between the satellite 14 and the ground station 16 may be indirect (i.e. via another ground station dedicated to the satellite communications system).

The airplane 4 carries a terminal 22 incorporated in the equipment on board the airplane. The terminal 22 is suitable for communicating with the ground depending on circumstances either via the satellite communication infrastructure and thus via one of the satellites 14, or without passing via a satellite by using the terrestrial AeroWimax infrastructure.

In this example, the same terminal 22 on board the airplane provides both types of communication. By using protocols that are similar in frequency bands 18 and 20 that are close together for communicating either directly with the AeroWimax infrastructure or with the satellite infrastructure of the invention, it is possible to incorporate both types of function within a single terminal 22 and to use the same antenna 32 associated with that terminal and carried by the airplane for both modes of communication. The invention thus makes it possible within a single piece of on-board equipment 22 to incorporate communications means:

- for use when the airplane is on the ground via the AeroWimax infrastructure, when available;
- for use when the airplane is in flight via the satellite infrastructure of the invention; and
- for use when the airplane is on the ground via the same infrastructure assuming that the AeroWimax infrastructure is not available. This assumption is represented in FIG. 1 by the link 34 between the airplane on the ground and the satellite 14.

This ability to use the same equipment 22 for communicating in different operating circumstances of the airplane serves to reduce installation costs, volume, weight, and power consumption of the data communication equipment and also to simplify the architecture of the equipment since it is based on standard protocols. The invention thus provides a communications system of weight and volume that are small compared with existing solutions because of the integration within a single terminal. The use of a single antenna 32 for both communications scenarios serves to improve the cost of the installation and also to improve the impact of the antenna on the aerodynamics of the airplane.

Figure 3:
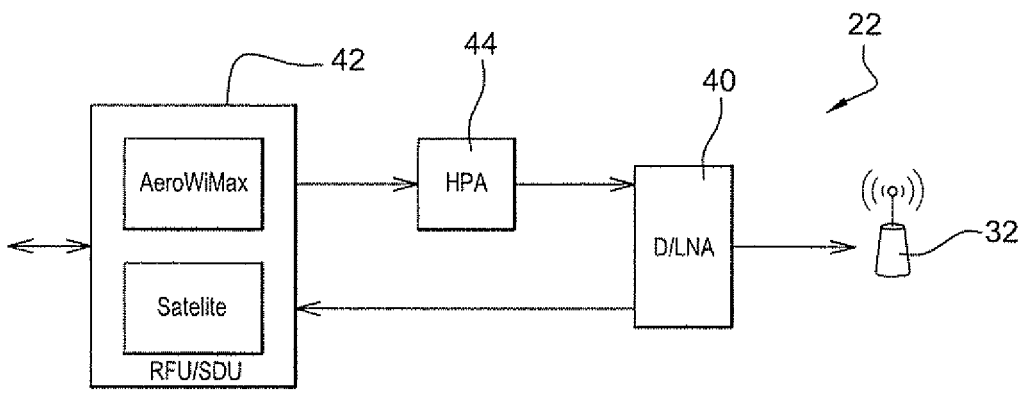
FIG. 3 is a diagram showing the member of the terminal fitted to the airplane of FIG. 1.

FIG. 3 shows the main members of the on-board equipment 22 for providing such communication. The antenna 32 extends outside the airplane and is thus connected to a diplexer-low noise amplifier (D/LNA) 40. The communications received by the antenna 32 thus pass via the diplexer 40 and are conveyed to a radio frequency unit (RFU) 42 that also forms a satellite data unit (SSU). The data is then conveyed to members of the airplane, in particular servers and computers, constituting the destinations for the data. Communications that are to be transmitted by the airplane are conveyed by the unit 42 to a high power amplifier (HPA) 44, to the diplexer 40, and then to the antenna 32. The elements in the radio-processing system (high power amplifier 44, diplexer 40, and antenna 32) are used in common for both communications modes, i.e. regardless of whether communication is via a satellite 14 in accordance with the invention or direct and of the AeroWimax type. Changeover from or to baseband and baseband processing takes place within the same piece of equipment 42. As can be seen, the invention maximizes integration of the two functions constituted by AeroWimax communication and by satellite communication.

Each of the elements of the system 2 formed by the terminal 22, the satellite 14, and the ground station 16 includes computer and electronic members suitable for implementing the above-described method, and in particular processors, memories, clocks, . . . .

Naturally, numerous modifications may be made to the invention without going beyond the ambit thereof.

A single member may combine the functions of the high power amplifier 44 and of the radiofrequency unit and satellite data unit 42. The diplexer-low noise amplifier 40 may be incorporated in the antenna 32. Provision may be made for the equipment 32 to be associated with two separate antennas that are dedicated respectively to satellite communications in accordance with the invention and to AeroWimax type communications. The invention may be implemented by being incorporated in a terrestrial system suitable for use in flight. The invention may be incorporated in a terminal combining access to a plurality of terrestrial or satellite communications systems (e.g. Iridium/Inmarsat or Aircel/GSM).

The invention claimed is:

1. An on-board communications terminal for an aircraft to communicate with a ground station via a satellite, the on-board communications terminal comprising:
   a receiver configured to receive a first radiowave signal;
   a transmitter configured to transmit a second radiowave signal;
   the on-board communications terminal being configured to communicate by radiowaves with the outside of the on-board communications terminal in a frequency band extending from 5030 MHz to 5091 MHz, bounds included, in application of a WiMax transmission standard, and
   at least one of the following parameters of the WiMax transmission standard is modified to enable communication during flight between the aircraft and the ground station via the satellite in the frequency band: channel structure, modulation, coding, guard times, or guard bands.

2. The on-board communications terminal according to claim 1, wherein the on-board communications terminal is configured to communicate in a second frequency band extending from 5091 MHz to 5150 MHz, bounds included, in application of an AeroWimax transmission standard, the on-board communications terminal being configured to use the same antenna for communication in both frequency bands.

3. An aircraft, including the on-board communications terminal according to claim 1.

4. The on-board communications terminal according to claim 1, wherein the receiver and the transmitter both form a radio frequency unit configured to receive and transmit the first and second radiowave signal.

5. A satellite for communicating with an outside of the satellite, the satellite comprising:
   a receiver configured to receive a first radiowave signal;
   a transmitter configured to transmit a second radiowave signal;
   the satellite being configured to communicate with the outside of the satellite by radiowaves in a frequency band extending from 5030 MHz to 5091 MHz, bounds included, in application of a WiMax transmission standard, and
   at least one of the following parameters of the WiMax transmission standard is modified to enable communication during flight between an aircraft and ground via satellite in the frequency band: channel structure, modulation, coding, guard times, or guard bands.

6. The satellite according to claim 5, wherein the receiver and the transmitter both form a radio frequency unit configured to receive and transmit the first and second radiowave signal.

7. A ground station for communicating with aircraft, the ground station comprising:
   a receiver configured to receive a first radiowave signal;
   a transmitter configured to transmit a second radiowave signal;
   the ground station being configured to communicate by radiowaves with the outside of the station in a frequency band extending from 5030 MHz to 5091 MHz, bounds included, in application of a WiMax transmission standard, and at least one of the following parameters of the WiMax transmission standard is modified to enable communication during flight between the aircraft and ground via satellite in the frequency band: channel structure, modulation, coding, guard times, or guard bands.

8. The ground station according to claim 7, wherein the receiver and the transmitter both form a radio frequency unit configured to receive and transmit the first and second radiowave signal.

9. A communications system, comprising at least two of the following elements:

the aircraft according to claim 3;

the satellite configured to communicate with the outside of the satellite by radiowaves in the frequency band extending from 5030 MHz to 5091 MHz, bounds included, in application of the WiMax transmission standard; and the ground station configured to communicate with the aircraft during flight, wherein the ground station is suitable for communicating by radiowaves with the outside of the station in the frequency band extending from 5030 MHz to 5091 MHz, bounds included, in application of the WiMax transmission standard.

10. A communications method between an aircraft and the ground, the method comprising:

communicating by radiowaves between the aircraft and the ground via at least one satellite and in a frequency band extending from 5030 MHz to 5091 MHz, bounds included, using a WiMax transmission standard, wherein at least one of the following parameters of the WiMax transmission standard is modified to enable communication during flight between the aircraft and ground via satellite in the frequency band: channel structure, modulation, coding, guard times, or guard bands.

11. A communications method for an aircraft and an outside of the aircraft, the method comprising:

communicating by radiowaves between the aircraft and the outside of the aircraft in a frequency band extending from 5030 MHz to 5091 MHz, bounds included, in application of a WiMax transmission standard, wherein at least one of the following parameters of the WiMax transmission standard is modified to enable communication during flight between the aircraft and ground via satellite in the frequency band: channel structure, modulation, coding, guard times, or guard bands.

12. A communications method for a satellite and an outside of the satellite, the method comprising:

communicating by radiowaves between the satellite and the outside of the satellite in a frequency band extending from 5030 MHz to 5091 MHz, bounds included, in application of a WiMax transmission standard, wherein at least one of the following parameters of the WiMax transmission standard is modified to enable communication during flight between an aircraft and ground via satellite in the frequency band: channel structure, modulation, coding, guard times, or guard bands.

13. A communications method for a ground station and an outside of the ground station, the method comprising:

communicating by radiowaves between the ground station and the outside of the station in a frequency band extending from 5030 MHz to 5091 MHz, bounds included, in application of a WiMax transmission standard, wherein at least one of the following parameters of the WiMax transmission standard is modified to enable communication during flight between an aircraft and ground via satellite in the frequency band: channel structure, modulation, coding, guard times, or guard bands.

\* \* \* \* \*